United States Patent
Smoke et al.

(10) Patent No.: US 10,294,804 B2
(45) Date of Patent: May 21, 2019

(54) DUAL ALLOY GAS TURBINE ENGINE ROTORS AND METHODS FOR THE MANUFACTURE THEREOF

(71) Applicants: Jason Smoke, Phoenix, AZ (US); Eric Blumer, Scottsdale, AZ (US); David K. Jan, Fountain Hills, AZ (US); Robbie Joseph Adams, Phoenix, AZ (US); Harry Lester Kington, Scottsdale, AZ (US)

(72) Inventors: Jason Smoke, Phoenix, AZ (US); Eric Blumer, Scottsdale, AZ (US); David K. Jan, Fountain Hills, AZ (US); Robbie Joseph Adams, Phoenix, AZ (US); Harry Lester Kington, Scottsdale, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 340 days.

(21) Appl. No.: 14/823,787

(22) Filed: Aug. 11, 2015

(65) Prior Publication Data

US 2017/0044912 A1    Feb. 16, 2017

(51) Int. Cl.
*F01D 5/30* (2006.01)
*B23K 1/00* (2006.01)
(Continued)

(52) U.S. Cl.
CPC .......... *F01D 5/3061* (2013.01); *B23K 1/0018* (2013.01); *F01D 5/02* (2013.01);
(Continued)

(58) Field of Classification Search
CPC ........ F01D 5/30601; F01D 5/22; F01D 5/147; F01D 5/02; F01D 5/04; B23K 1/0018;
(Continued)

(56) References Cited

U.S. PATENT DOCUMENTS

| 2,384,919 A | 9/1945 | Huber |
| 2,392,281 A * | 1/1946 | Allen .................... B23K 33/004 228/165 |

(Continued)

FOREIGN PATENT DOCUMENTS

| DE | 2130128 A1 | 12/1972 |
| DE | 102009048632 A1 | 4/2001 |

(Continued)

OTHER PUBLICATIONS

USPTO Office Action for U.S. Appl. No. 14/701,262 dated Aug. 1, 2017.

(Continued)

*Primary Examiner* — Dwayne J White
*Assistant Examiner* — Adam W Brown
(74) *Attorney, Agent, or Firm* — Lorenz & Kopf, LLP

(57) ABSTRACT

Dual alloy Gas Turbine Engine (GTE) rotors and method for producing GTE rotors are provided. In one embodiment, the method include includes arranging bladed pieces in an annular grouping or ring formation such that shank-to-shank junctions are formed between circumferentially-adjacent bladed pieces. A first or bonding alloy is deposited along the shank-to-shank junctions utilizing a localized fusion deposition process to produce a plurality of alloy-filled joints, which join the bladed pieces in a bonded blade ring. The bonding alloy is preferably selected to have a ductility higher than and a melt point lower than the alloy from which the bladed pieces are produced. After deposition of the first alloy and formation of the alloy-filled joints, a hub disk is inserted into the central opening of the bonded blade ring. The hub disk and blade ring are then bonded utilizing, for example, a Hot Isostatic Pressing process.

15 Claims, 6 Drawing Sheets

(51) Int. Cl.
*F01D 5/02* (2006.01)
*F01D 5/14* (2006.01)
*F01D 5/22* (2006.01)
*F01D 5/06* (2006.01)
*F01D 25/12* (2006.01)
*F02C 9/18* (2006.01)

(52) U.S. Cl.
CPC .............. *F01D 5/06* (2013.01); *F01D 5/066* (2013.01); *F01D 5/147* (2013.01); *F01D 5/22* (2013.01); *F01D 25/12* (2013.01); *F02C 9/18* (2013.01); *F05D 2220/32* (2013.01); *F05D 2230/233* (2013.01); *F05D 2230/234* (2013.01); *F05D 2230/236* (2013.01); *F05D 2230/30* (2013.01); *F05D 2300/17* (2013.01); *F05D 2300/5023* (2013.01); *F05D 2300/518* (2013.01); *Y02T 50/671* (2013.01); *Y02T 50/675* (2013.01)

(58) Field of Classification Search
CPC ......... F05D 2230/234; F05D 2230/233; F05D 2300/17; F05D 2300/5023; F05D 2300/518; F05D 2220/32
See application file for complete search history.

(56) References Cited

U.S. PATENT DOCUMENTS

| | | | | |
|---|---|---|---|---|
| 2,423,165 A * | 7/1947 | Allen | .............. | F01D 5/3061 416/213 R |
| 2,450,493 A * | 10/1948 | Strub | .............. | B23K 5/006 29/889.21 |
| 2,454,580 A * | 11/1948 | Thielemann | .............. | B23K 5/006 219/137 R |
| 3,246,389 A * | 4/1966 | Pfau | .............. | B23K 9/0026 228/44.7 |
| 3,292,245 A * | 12/1966 | Pfau | .............. | B23K 9/0026 228/44.3 |
| 3,590,454 A * | 7/1971 | Brass | .............. | B23P 15/006 29/889.21 |
| 3,692,501 A * | 9/1972 | Hoppin et al. | .............. | B23K 35/004 428/554 |
| 3,928,029 A * | 12/1975 | Fisk | .............. | B23K 35/302 148/411 |
| 4,096,615 A * | 6/1978 | Cross | .............. | B23K 35/304 228/175 |
| 4,152,816 A * | 5/1979 | Ewing | .............. | B22F 7/062 228/104 |
| 4,270,256 A * | 6/1981 | Ewing | .............. | B22F 5/04 228/191 |
| 4,494,287 A | 1/1985 | Cruzen et al. | | |
| 4,529,452 A | 7/1985 | Walkar | | |
| 4,538,331 A | 9/1985 | Egan et al. | | |
| 4,573,876 A | 3/1986 | Egan et al. | | |
| 4,581,300 A * | 4/1986 | Hoppin, III | .............. | B23K 20/00 228/175 |
| 4,592,120 A | 6/1986 | Egan et al. | | |
| 4,659,288 A | 4/1987 | Clark et al. | | |
| 4,671,448 A | 6/1987 | Million et al. | | |
| 4,710,103 A | 12/1987 | Faber et al. | | |
| 4,782,206 A | 11/1988 | Ayres et al. | | |
| 4,812,107 A | 3/1989 | Barcella et al. | | |
| 4,864,706 A | 9/1989 | Jenkel | | |
| 4,907,947 A | 3/1990 | Hoppin, III | | |
| 5,061,154 A | 10/1991 | Kington | | |
| 5,106,012 A | 4/1992 | Hyzak et al. | | |
| 5,113,583 A | 5/1992 | Jenkel et al. | | |
| 5,273,708 A | 12/1993 | Freeman | | |
| 5,390,413 A | 2/1995 | Pratt | | |
| 6,098,871 A | 8/2000 | Cairo et al. | | |
| 6,118,098 A * | 9/2000 | Amos | .............. | B23K 9/04 219/121.11 |
| 6,274,839 B1 | 8/2001 | Stone et al. | | |
| 6,326,585 B1 * | 12/2001 | Aleshin | .............. | B23K 26/032 219/121.63 |
| 6,709,771 B2 * | 3/2004 | Allister | .............. | B22F 5/04 148/527 |
| 6,814,544 B2 | 11/2004 | Tsukamoto et al. | | |
| 6,969,238 B2 | 11/2005 | Groh et al. | | |
| 7,316,057 B2 | 1/2008 | Seth | | |
| 7,438,530 B2 | 10/2008 | Ferte et al. | | |
| 7,560,065 B2 | 7/2009 | Troitski et al. | | |
| 7,634,854 B2 | 12/2009 | Meier | | |
| 7,722,330 B2 | 5/2010 | Seth | | |
| 7,766,623 B2 | 8/2010 | Chou et al. | | |
| 7,832,986 B2 | 11/2010 | Baker et al. | | |
| 7,967,924 B2 | 6/2011 | Groh et al. | | |
| 8,043,068 B2 | 10/2011 | Imano et al. | | |
| 8,220,697 B2 | 7/2012 | Kottilingam et al. | | |
| 8,266,800 B2 | 9/2012 | Segletes et al. | | |
| 8,356,980 B2 * | 1/2013 | Izadi | .............. | B23K 20/12 29/889.2 |
| 8,360,302 B2 * | 1/2013 | Richter | .............. | B23K 13/015 228/112.1 |
| 8,408,446 B1 * | 4/2013 | Smoke | .............. | B23P 15/006 228/193 |
| 8,496,443 B2 | 7/2013 | Campbell et al. | | |
| 8,506,836 B2 | 8/2013 | Szuromi et al. | | |
| 8,631,577 B2 | 1/2014 | Ing | | |
| 8,662,851 B2 | 3/2014 | Izadi | | |
| 8,668,442 B2 | 3/2014 | Morris et al. | | |
| 8,801,338 B2 | 8/2014 | Ortiz | | |
| 8,961,132 B2 | 2/2015 | Suciu et al. | | |
| 9,033,670 B2 | 5/2015 | Mittendorf et al. | | |
| 9,724,780 B2 * | 8/2017 | Miner | .............. | B23K 20/028 |
| 2003/0189028 A1 | 10/2003 | Wright et al. | | |
| 2006/0166020 A1 | 7/2006 | Raybould et al. | | |
| 2006/0239825 A1 | 10/2006 | Rice et al. | | |
| 2006/0260126 A1 | 11/2006 | Groh et al. | | |
| 2008/0107531 A1 | 5/2008 | Chou et al. | | |
| 2009/0068016 A1 | 3/2009 | Perron et al. | | |
| 2009/0119919 A1 * | 5/2009 | Kington | .............. | B23P 15/006 29/889.7 |
| 2009/0162205 A1 | 6/2009 | Strangman et al. | | |
| 2010/0193480 A1 * | 8/2010 | Adams | .............. | B23K 9/04 219/121.15 |
| 2010/0284817 A1 | 11/2010 | Bamberg et al. | | |
| 2011/0176922 A1 | 7/2011 | Schmidt | | |
| 2014/0093384 A1 | 4/2014 | Mironets et al. | | |
| 2014/0124483 A1 | 5/2014 | Henn | | |
| 2014/0130353 A1 | 5/2014 | Kington et al. | | |
| 2014/0314581 A1 | 10/2014 | McBrien et al. | | |
| 2015/0118048 A1 | 4/2015 | Kington et al. | | |
| 2015/0144496 A1 | 5/2015 | Morris et al. | | |

FOREIGN PATENT DOCUMENTS

| | | |
|---|---|---|
| EP | 2626169 A2 | 2/2013 |
| EP | 2650474 A2 | 10/2013 |
| EP | 2865482 A1 | 4/2015 |
| EP | 3000556 A1 | 9/2015 |
| EP | 2952687 A2 | 12/2015 |

OTHER PUBLICATIONS

Hoppin; Manufacturing Processes for Long-Life Gas Turbines; abstract available online at http://link.springer.com; Jul. 1986, vol. 30, Issue 7, pp. 20-23.
Yang, J. et al.; HIP diffusion bonding of FGH96-DD6 dual alloys; available online at http://www.maneyonline.com; vol. 18, Issue 54, (Jul. 2014), pp. S4-429-S4-434.
EP Examination Report for Application No. 16166284.6-1373 dated Jun. 13, 2017.
Extended EP Search Report for Application No. 16166284.6-1373 dated Aug. 5, 2016.
Additive Manufacturing; Oct. 7, 2013; htlp://airinsight.com/2013/10/07/additive-manufacturing/#.
Additive Manufacturing 3D Printing; http://www.sciaky.com/additive_manufacturing.html; 2014 Sciaky, Inc. A Subsidiary of Phillips Service Industries, Inc.—All Rights Reserved.

(56) References Cited

OTHER PUBLICATIONS

Blumer, E. et al.; Bladed Gas Turbine Engine Rotors Having Deposited Transition Rings and Methods for the Manufacture Thereof; U.S. Appl. No. 14/701,262, filed Apr. 30, 2015.
Smoke, J. et al. Dual Alloy Bladed Rotors Suitable for Usage in Gas Turbine Engines and Methods for the Manufacture Thereof; U.S. Appl. No. 14/939,360, filed Nov. 12, 2015.
Extended EP Search Report for Application No. 16196480.4-1702 dated Jun. 14, 2017.
Extended EP Search Report for Application No. 16182276.2-1709 dated Oct. 31, 2016.
USPTO Notice of Allowance for U.S. Appl. No. 14/701,262 dated Dec. 6, 2017.
USPTO Notice of Allowance for U.S. Appl. No. 14/939,360 dated Mar. 30, 2018.
USPTO Office Action for U.S. Appl. No. 14/939,360 dated Jan. 17, 2018.

\* cited by examiner

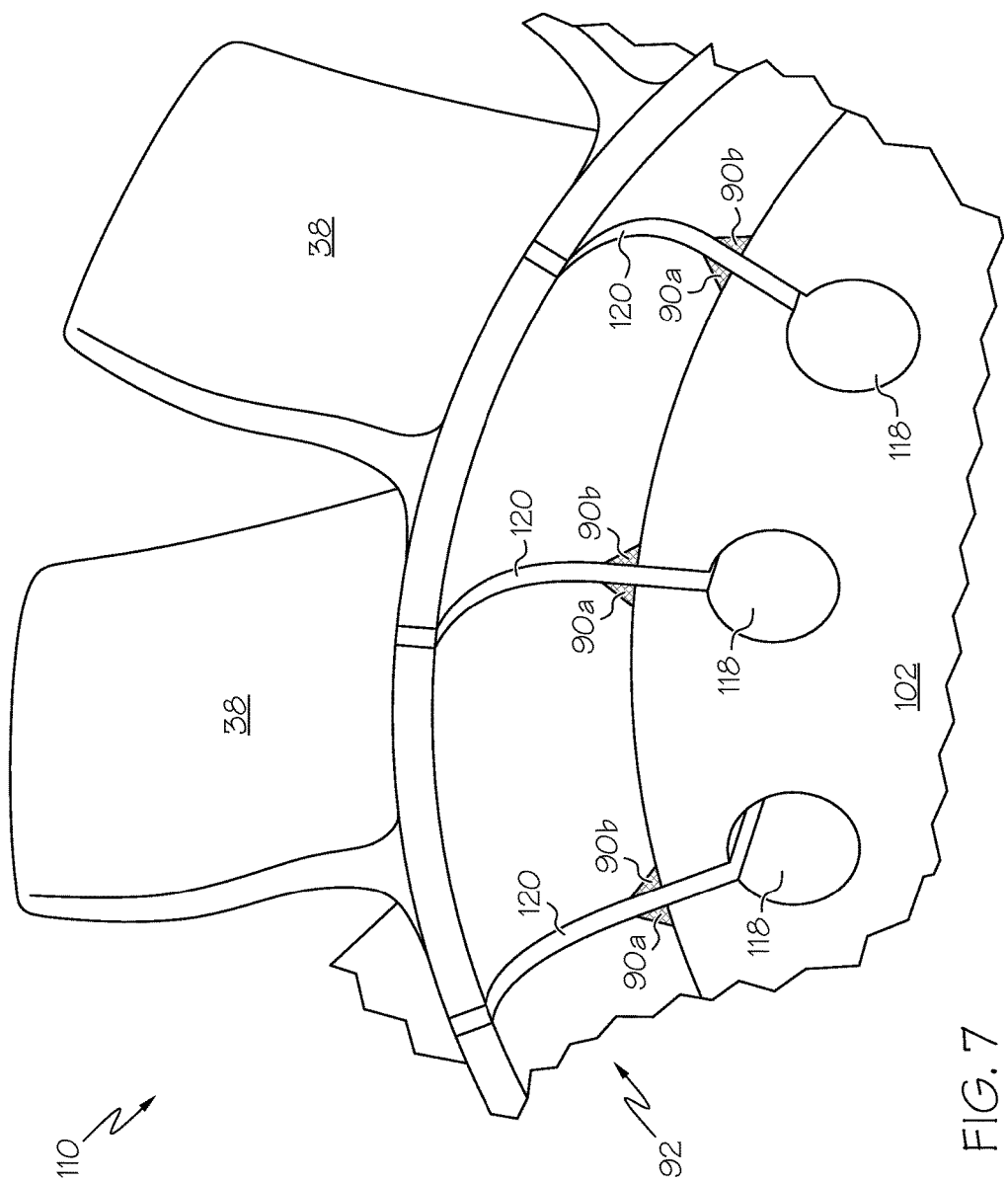

DUAL ALLOY GAS TURBINE ENGINE ROTORS AND METHODS FOR THE MANUFACTURE THEREOF

TECHNICAL FIELD

The present invention relates generally to gas turbine engines and, more particularly, to dual alloy gas turbine engine rotors and methods for the production thereof.

BACKGROUND

Bladed Gas Turbine Engine (GTE) rotors include axial compressor, radial or centrifugal compressor, axial turbine, radial-inflow turbine, and fan rotors. The thermal and mechanical demands placed on a dual alloy GTE rotor can vary significantly across the rotor during engine operation. The rotor blades are typically bathed in the core gas flow during engine operation and are consequently exposed to high temperature, chemically-harsh (e.g., corrosive and oxidative) environments. In contrast, the inner "hub disk" portion of the rotor is largely shielded from the core gas flow path, but is subject to considerable mechanical stress resulting from the centrifugal forces acting on the rotor at high rotational speeds. Performance benefits can thus be realized by fabricating the hub disk and rotor blades from different alloys tailored to their specific operating environments utilizing, for example, an inserted blade approach. To produce an inserted blade rotor, a number of bladed pieces are first produced from an alloy selected to provide good mechanical strength and oxidation resistance under high temperature conditions. Each bladed piece is fabricated to include at least one blade, which projects from an enlarged base portion or shank. The shanks are inserted into mating slots provided around the periphery of a separately-produced hub disk, which is fabricated from an alloy having high mechanical strength at operational temperatures. The shanks and mating slots are formed to have an interlocking geometry, such as a fir tree or dove tail interface, to prevent disengagement of the shanks in a radial direction during high speed rotation of the rotor.

While enabling the fabrication of a GTE rotor having a disk and blades fabricated from different alloys, the above-described manufacturing approach is limited in several respects. The formation of geometrically complex mating interfaces between the shanks and the hub disk often requires multiple precision machining steps, which add undesired cost, duration, and complexity to the manufacturing process. Additionally, it can be difficult to reliably form a complete seal between the mating shank-disk interfaces. If not fully sealed, these interfaces can permit undesired leakage across the GTE rotor and trap debris potentially increasingly the likelihood of corrosion-driven failures. As a still further limitation, the formation of the mating shank-disk interfaces may necessitate an increase in the overall size and weight of the dual alloy GTE rotor to achieve a structural integrity comparable to that of a monolithic GTE rotor. Certain other manufacturing methods have been developed wherein the disk hub and blade rings are separately produced from different alloys and subsequently bonded together or metallurgically consolidated to produce a so-called "dual alloy rotor"; however, such approaches are generally restricted to the usage of equiax superalloys having inferior high temperature properties as compared to single crystal and directionally-solidified superalloys.

It is thus desirable to provide methods for producing dual alloy GTE rotors that reduce the overall cost and complexity of manufacture, that minimize leakage across the rotor, and/or that allows a decrease in the overall size and weight of the rotor. Ideally, such manufacturing method would enable the rotor blades to be individually cast or otherwise fabricated from a wide variety of high temperature materials including single crystal and directionally-solidified superalloys. Finally, it would also be desirable to provide embodiments of a dual alloy GTE rotor produced utilizing such a manufacturing method. Other desirable features and characteristics of embodiments of the present invention will become apparent from the subsequent Detailed Description and the appended Claims, taken in conjunction with the accompanying drawings and the foregoing Background.

BRIEF SUMMARY

Methods for manufacturing dual alloy Gas Turbine Engine (GTE) rotors are provided. In one embodiment, the method includes arranging bladed pieces in an annular grouping or ring formation such that shank-to-shank junctions are formed between circumferentially-adjacent bladed pieces. A first or bonding alloy is deposited along the shank-to-shank junctions utilizing a localized fusion deposition process to produce a plurality of alloy-filled joints, which join the bladed pieces in a bonded blade ring. The bonding alloy is preferably selected to have a ductility higher than and a melt point lower than the alloy from which the bladed pieces are produced. By comparison, the bladed pieces can be cast or otherwise produced from a less ductile superalloy selected for strength, such as a directionally-solidified or single crystal superalloy. Localized fusion deposition processes suitable for depositing the bonding alloy include ion fusion formation, pulsed-arc metal inert gas welding, and laser cladding deposition processes, as well as other additive metal manufacturing processes. After deposition of the first alloy and formation of the alloy-filled joints, a hub disk is inserted into the central opening of the bonded blade ring. The hub disk and blade ring are then bonded utilizing, for example, a Hot Isostatic Pressing process.

In another embodiment, the GTE rotor manufacturing method includes the steps or processes of providing bladed pieces fabricated from a blade alloy. The bladed pieces are loaded into a tooling assembly, which maintains the bladed pieces in a ring formation. The tooling assembly includes a central opening providing access to an inner circumferential surface of the ring formation. A bonding alloy is fused to selected regions of the ring formation to create alloy-filled joints, which are spaced about the inner circumference of the ring formation and which join the bladed pieces in a bonded blade ring. The bonding alloy is selected to have a ductility greater than the ductility of the blade alloy and a melt point less than the melt point of the blade alloy. The bonded blade ring is then concentrically positioned around and bonded to a hub disk, which is composed of a hub disk alloy different than the blade alloy.

Embodiments of a dual alloy GTE rotor, such as an axial turbine rotor, are further provided. In embodiments, the dual alloy GTE rotor includes a blade ring comprised of a plurality of bladed pieces fabricated from a blade alloy. The plurality of bladed pieces are bonded to a hub disk, and alloy-filled joints are spaced about an inner circumference of the blade ring. The bonding alloy has a ductility greater than the ductility of the blade alloy and a melt point less than the melt point of the blade alloy. In one implementation, the plurality of bladed pieces are each cast from a single crystal or directionally-solidified superalloy. Strain relief features can be formed in the GTE rotor and extend from an outer circumferential surface thereof, through the alloy-filled joints, and into the hub disk.

BRIEF DESCRIPTION OF THE DRAWINGS

At least one example of the present invention will hereinafter be described in conjunction with the following figures, wherein like numerals denote like elements, and:

FIG. 7 is a detailed view of a portion of the dual alloy GTE rotor shown in FIG. 6 illustrating a selected number of the alloy-filled joints and the strain relief features in greater detail.

DETAILED DESCRIPTION

Figure 1:
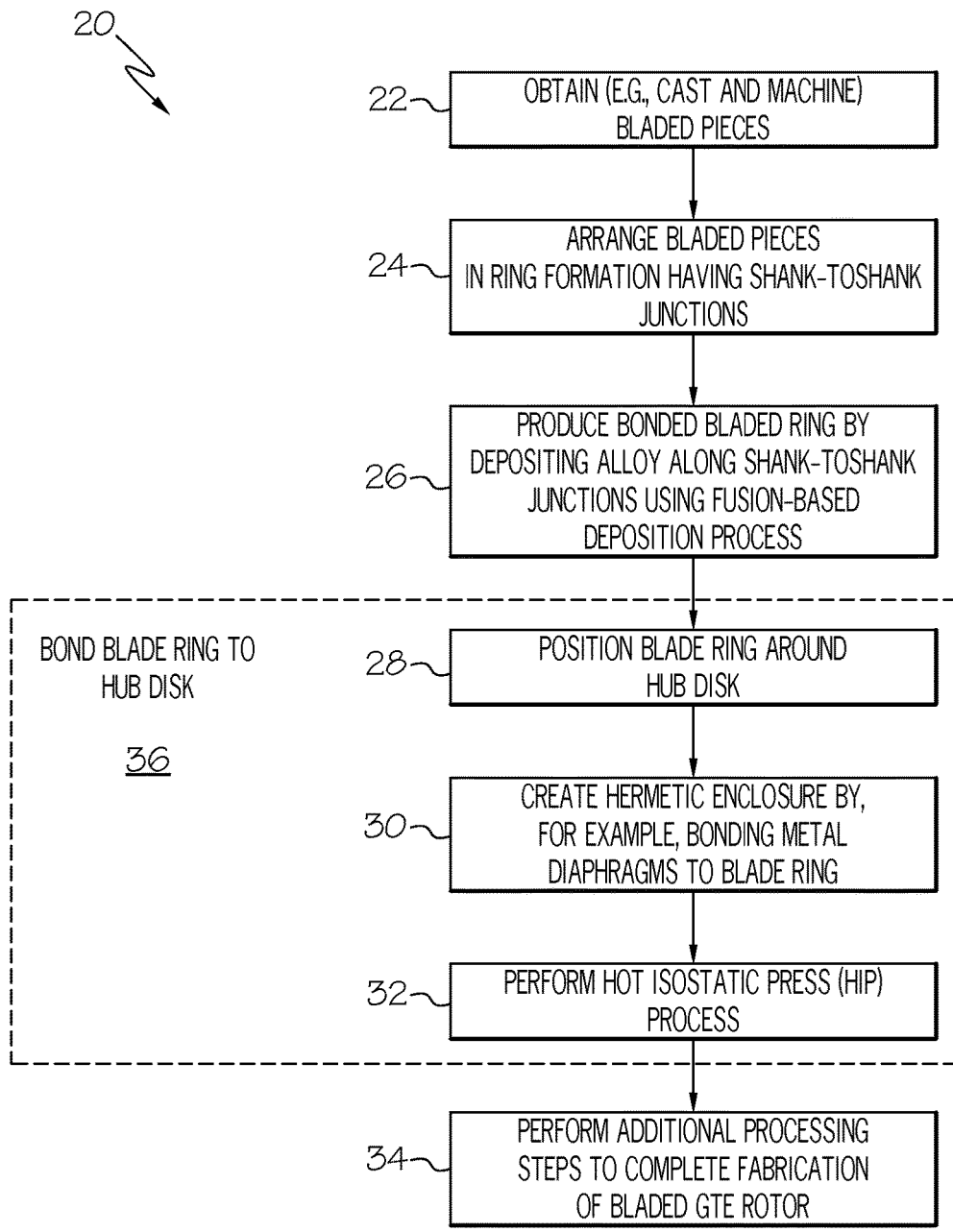
FIG. 1 is a flowchart setting-forth an exemplary method for manufacturing a dual alloy Gas Turbine Engine (GTE) rotor, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description. As appearing herein, the term "bladed gas turbine engine rotor," the term "dual alloy gas turbine engine rotor," and similar terms do not preclude the possibility that the bladed rotors can be utilized in devices or platforms other than gas turbine engines including, but not limited to, other types of turbomachines, such as turbochargers.

The following describes embodiments of a method for manufacturing dual alloy GTE rotors in manner that can reduce the overall cost and complexity of manufacture, that can reduce leakage across the rotor, and that enables rotor size and weight to be minimized. Additionally, the below-described manufacturing method allows the heat input to the rotor blade material to be carefully controlled. The thermal cycles to which the rotor blade material is exposed and can thus be minimized to help preserve blade strength. As a still further benefit, the below-described manufacturing method enables bladed pieces to be individually cast or otherwise produced from a wide range of alloys. Advantageously, this permits production of the bladed pieces from high strength materials, such as single crystal and directionally-solidified superalloys. Individual fabrication of the bladed pieces also enables blades having internal cooling features or other geometrically complex designs to be produced at relatively high yields reducing the cost and complexity of the manufacturing process.

During the manufacturing process, bladed pieces are arranged in a ring formation such that shank-to-shank junctions are formed between adjacent bladed pieces. An alloy (referred to herein as a "bonding alloy") is deposited along the shank-to-shank junctions to produce alloy-filled joints, which join the bladed pieces in a bonded blade ring. The alloy-filled joints can be formed around the inner and/or outer circumference of the blade ring. Deposition of the bonding alloy is carried-out utilizing a localized fusion deposition process; that is, a deposition process during which the bonding alloy is heated to a sufficient temperature (a temperature exceeding the melt point or softening point of the alloy) to fuse the alloy to the bladed pieces in a localized or discrete, rather than global, manner. Localized fusion deposition processes suitable for depositing the bonding alloy include Ion Fusion Formation (IFF), pulsed-arc Metal Inert Gas (MIG) welding, and laser cladding deposition processes, as well as other metal additive metal manufacturing processes. The localized deposition process is preferably computer controlled to precisely regulate the heating of the bladed pieces and thereby minimize the heat effected zones of the blades. Depending upon process parameters and the selected deposition technique, each alloy-filled joint can be deposited in a single pass or gradually built-up to desired dimensions. After the localized fusion deposition process, the bonded blade ring can be positioned around a hub disk and bonded thereto utilizing, for example, a Hot Isostatic Pressing (HIP) process. Additional processes (e.g., the application of coating or coating systems, additional machining, etc.) can then be carried-out to complete fabrication of the dual alloy GTE rotor.

An exemplary embodiment of a method for manufacturing a dual alloy GTE rotor will now be described in conjunction with FIGS. 1-7. For purposes of explanation, the following describes the exemplary manufacturing method in conjunction with the manufacture of a particular type of dual alloy GTE rotor, namely, an axial turbine rotor shown at various stages of completion in FIGS. 3-7. The following notwithstanding, it is emphasized that the following description is provided by way of non-limiting example only. The below-described manufacturing method can be utilized to produce any component utilized within a gas turbine engine and having a plurality of blades or airfoils joined to an inner body or hub disk. A non-exhaustive list of such components includes other types of axial turbine rotors, radial-inflow turbine rotors, axial compressor rotors, radial or centrifugal compressor rotors (also referred to as "impellers"), and fan rotors. The dual alloy GTE rotors described below will often be utilized within a gas turbine engine of the type deployed on an aircraft as a propulsive engine, an Auxiliary Power Unit (APU), or a turboshaft engine. It is noted, however, that the dual alloy GTE rotors produced pursuant to the below-described manufacturing method can be utilized within any type of gas turbine engine or turbomachine, regardless of application or design.

FIG. 1 is a flowchart setting-forth an exemplary method 20 for manufacturing a dual alloy GTE rotor in accordance with an exemplary embodiment of the present invention. As shown in FIG. 1, method 20 includes a number of sequentially-performed STEPS 22, 24, 26, 28, 30, 32, and 34. Depending upon the particular manner in which method 20 is implemented, each step generically illustrated in FIG. 1 may entail any number of individual sub-processes or combination of sub-processes. Additionally, as indicated in FIG. 1 by PROCESS BLOCK 36, STEPS 28, 30, and 32 can be performed in the context of a larger sub-process. STEPS 22, 24, 26, 28, 30, 32, and 34 will each be described, in turn, below. The following description notwithstanding, it is emphasized that the steps illustrated in FIG. 1 and described below are provided by way of example only; in alternative embodiments of method 20, additional steps may be performed, certain steps may be omitted, and/or the illustrated steps may be performed in alterative sequences.

Exemplary method 20 commences with obtaining a number of separately-fabricated bladed pieces (STEP 22, FIG. 1). The bladed pieces can be independently produced, purchased from a supplier, or otherwise obtained during STEP 22. The bladed pieces can be produced utilizing any one of a number of different manufacturing techniques and from various different materials. For example, the bladed pieces can be individually cast from a superalloy having relatively high mechanical strength under high temperature conditions. Machining can also be performed post-casting, if needed. In one embodiment, each bladed piece are cast or otherwise produced from a single crystal or directionally-solidified superalloy having its crystallographic grain structure oriented to provide optimal mechanical strength in a radial direction. A creep-resistant, single crystal, nickel-based superalloy may be utilized, such as the nickel-based superalloys commercially identified as "CMSX 3," "CMSX 4," "SC180," and "1484," to list but a few examples. In further embodiments, the bladed pieces can be produced in other manner and fabricated from other high temperature materials, such as equiaxed superalloys. Notably, the initial fabrication of a plurality of discrete bladed pieces, provides several advantages as compared to the production of full blade ring. By initially casting or otherwise producing individual bladed pieces, any defective or unusable pieces can be identified prior to integration into the bonded blade ring; consequently, scrap volume and cost can be greatly reduced as compared to a single shot casting process wherein any voiding, occlusions, or other defects may require rejection of the entire ring casting. In addition, casting can be typically be more reliably and precisely controlled for smaller volume pieces; thus, casting individual bladed pieces generally allows for higher yields due to more reliable filling of the individual bladed pieces and the production of bladed pieces having relatively complex external and internal features, such as internal cooling passages and heat transfer enhancement features.

Figure 2:
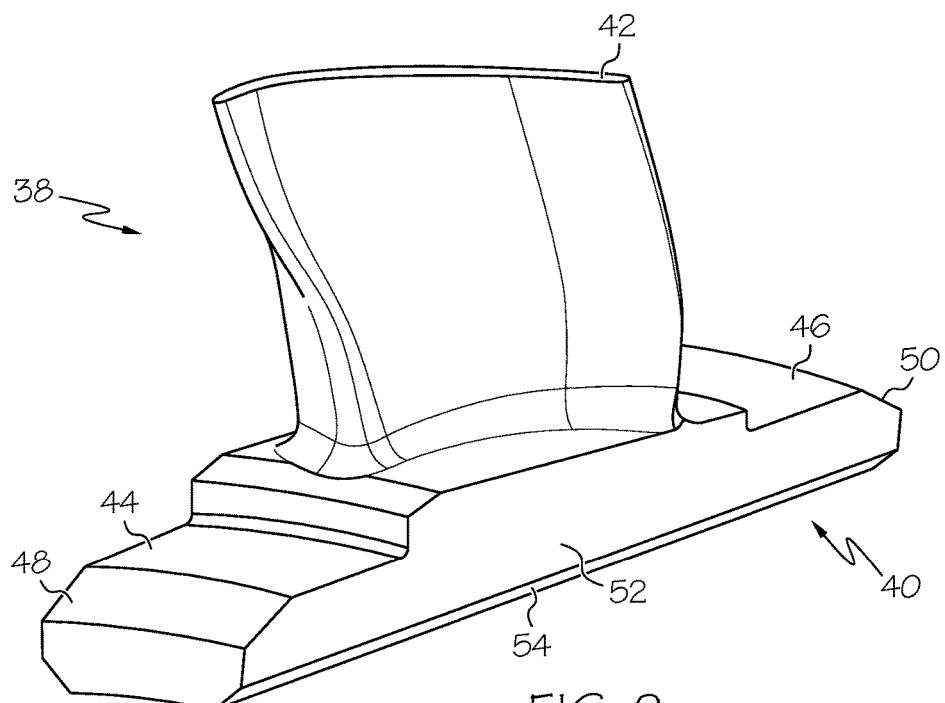
FIG. 2 is an isometric view of a bladed piece that may be produced or otherwise obtained along with a number of like bladed pieces during the exemplary manufacturing method shown in FIG. 1.

FIG. 2 is an isometric view of an exemplary bladed piece 38 that may be obtained during STEP 22 of method 20 (FIG. 1) along with a number of similar bladed pieces (not shown). Bladed piece 38 includes a wedge-shaped body or shank 40 from which an airfoil or blade 42 extends in a radially-outward direction. In this example, shank 40 has been cast or otherwise fabricated to include an outer sacrificial portion that envelops or encompasses the desired shape of the completed shank. Stated differently, shank 40 is a rough casting or preform physically embodying the finished shank, which may later be defined by further machining as described below in conjunction with FIGS. 6 and 7. Shank 40 includes shoulders 44 and 46, which extend from the central body of shank 40 in opposing axial directions. Shoulders 44 and 46 are fabricated to include outer tooling contact surfaces 48 and 50, respectively, which are located axially adjacent the forward and aft ends of blade 42 and which have a gently curved or arced outer geometry. Shank 40 also includes opposing lateral faces or sidewall surfaces 52, only one of which can be seen in FIG. 2. Sidewall surfaces 52 are each angled to impart shank 40 with a wedge-shaped geometry, when viewed from the forward/leading or aft/trailing end thereof. In further embodiments, the geometry and structure of bladed piece 38 can vary; e.g., each bladed piece can be fabricated to include two or more blades in further embodiments.

With continued reference to FIG. 2, inner longitudinal-extending edges 54 of shank 40 have been "broken" or imparted with a beveled geometry. In embodiments wherein bladed piece 38 is cast, beveled edges 54 can be produced during the initial casting process or, instead, formed post-casting utilizing a machining process. By producing bladed piece 38 and other non-illustrated bladed pieces to include beveled longitudinal edges 54, radial depressions or recesses are created along the shank-to-shank junctions when the bladed pieces are arranged in a ring formation. As described below, the recesses can cooperate to form of wedge-shaped trenches, which extend along the shank-to-shank junctions and increase the surface area available for bonding with the fusion-deposited bonding alloy. Furthermore, in embodiments wherein the alloy-filled joints are created about the inner circumference of the blade ring, such recesses enable the bonding alloy to be deposited to a greater radial thickness to ensure that a sufficient amount of the alloy remains should material be removed from the inner circumference of the blade ring. In further embodiments, the radial depressions or recesses (if present) can be produced to have other geometries and dispositions on the surfaces of the bladed pieces onto which the below-described bonding alloy is deposited.

Exemplary method 20 continues with arranging the bladed pieces in an annular grouping or ring formation (STEP 24, FIG. 1). When so arranged, the bladed pieces cooperate to define shank-to-shank interfaces or junctions between circumferentially-adjacent pieces in the ring formation. A tooling fixture or assembly can be utilized to retain the bladed pieces in their desired positions for subsequent processing. The tooling assembly can assume any form suitable for maintaining the bladed pieces in a ring formation through the alloy deposition process, as described below. Also, to enable deposition of the bonding alloy, the tooling assembly is designed to provide physical and visual access to regions of the ring formation onto which the bonding alloy is deposited; e.g., the inner and/or outer circumference of the ring formation around which alloy-filled joints are produced. It is also generally preferred, although not essential, that the tooling assembly is reusable to help reduce manufacturing costs. An example of a reusable tooling assembly meeting the foregoing criteria is described below in conjunction with FIG. 3. The following example notwithstanding, it will be appreciated that the tooling assembly can assume other forms in further embodiments; e.g., in further embodiments, the tooling assembly can include one or more shrink rings, which are thermally expanded, positioned around annular tooling contact surfaces of the ring formation, and then allowed to cool and contract to exert a radially constrictive force maintaining the bladed pieces in the desired ring formation.

Figure 3:
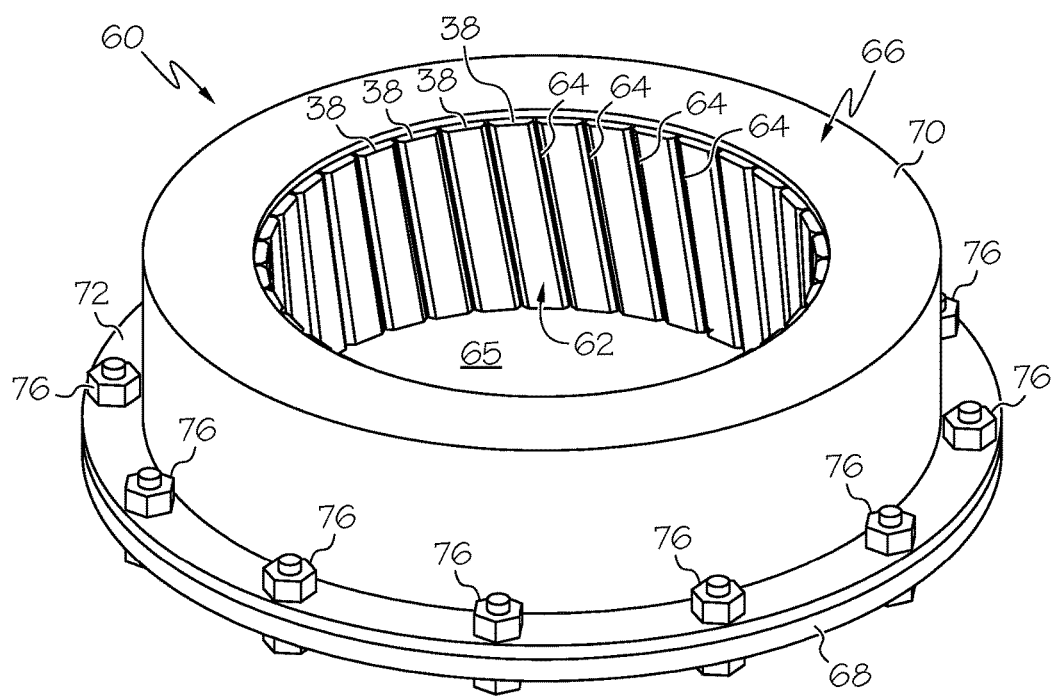
FIG. 3 is an isometric view a tooling assembly maintaining the bladed piece shown in FIG. 2 and a number of similar bladed pieces in an annular grouping or ring formation for further processing.

FIG. 3 is an isometric view of an exemplary reusable tooling assembly 60 suitable for maintaining a plurality of bladed pieces in an annular grouping or ring formation 62 during the fusion-based alloy-deposition process described below. The bladed pieces included in ring formation 62 are each substantially identical to bladed piece 38 described above in conjunction with FIG. 2. Accordingly, each of the bladed pieces shown in FIG. 3 is identified by reference numeral "38," and the features of each bladed pieces may also be identified utilizing the reference numerals set-forth above. To avoid visual clutter of FIG. 3 and the other drawing figures presented herein, only a few of a particular structural feature or element may be labeled when a relatively large number of the features or elements are shown in the drawing figure. For example, in FIG. 3, only a four bladed pieces 38 are labeled for clarity. As can be seen in FIG. 3, beveled edges 54 (FIG. 2) of bladed pieces 38 combine to form wedge-shaped channels or open trenches 64 when pieces 38 are arranged into ring formation 62. Trenches 64 extend in axial and tangential directions along the shank-to-shank junctions of bladed pieces 38. Trenches 64 may extend across the entirety of ring formation 62 in a longitudinal direction or, stated differently, between the axially-opposed (forward and aft) faces of the ring formation. In the illustrated example, tooling assembly 60 includes first and second mating parts 66 and 68, which are affixed utilizing a plurality of bolts 76 or other such fasteners. A central opening 65 is provided through tooling assembly 60 to allow visual and manual access to the shank-to-shank junctions and trenches 64 spaced about the inner circumferential surface of ring formation 62.

Figure 4:
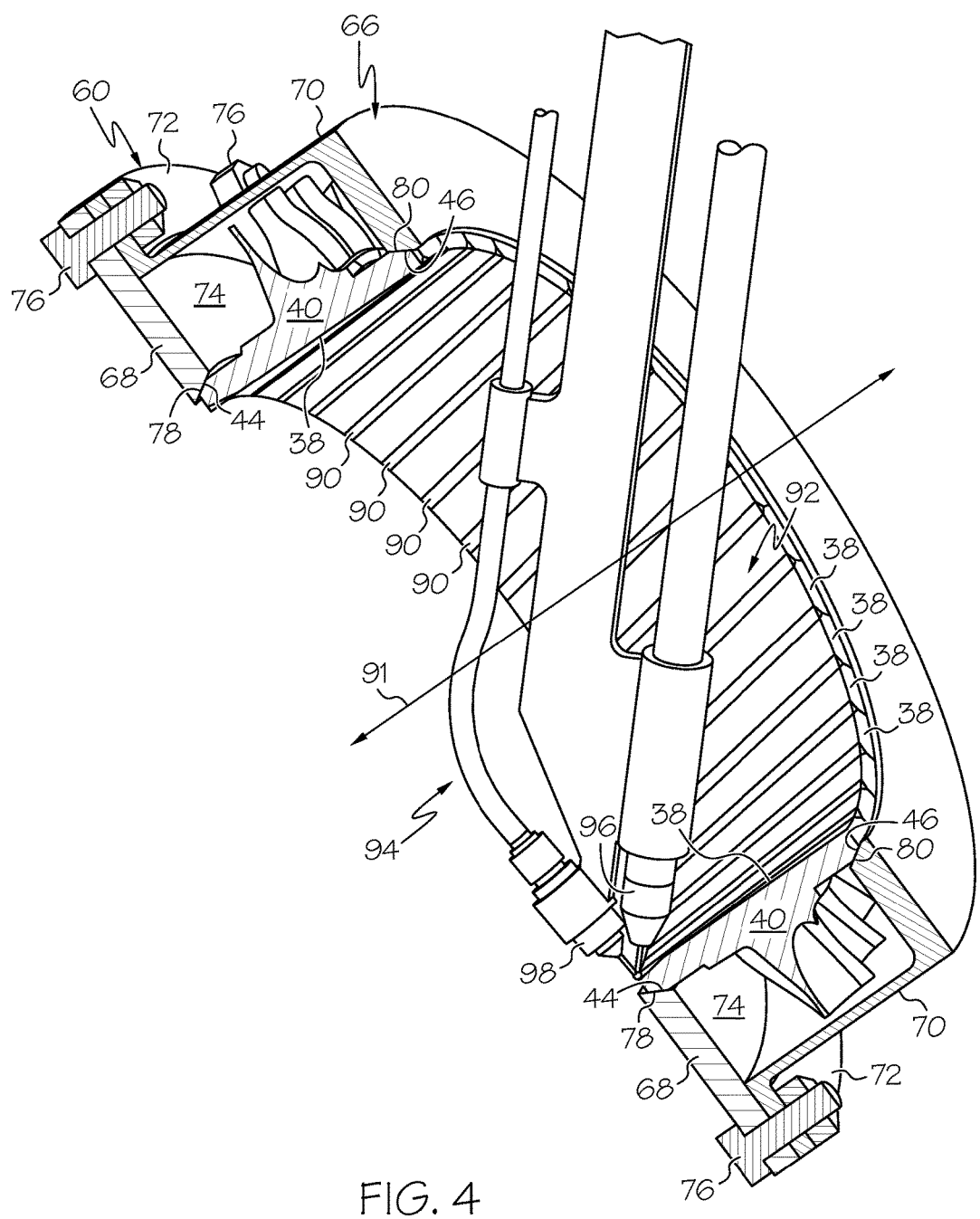
FIG. 4 is a cross-sectional view of the tooling assembly and bladed pieces shown in FIG. 3 illustrating one manner in which a bonding alloy can be deposited along the shank-to-shank junctions utilizing a localized fusion deposition process to yield a bonded blade ring.
Figure 5:
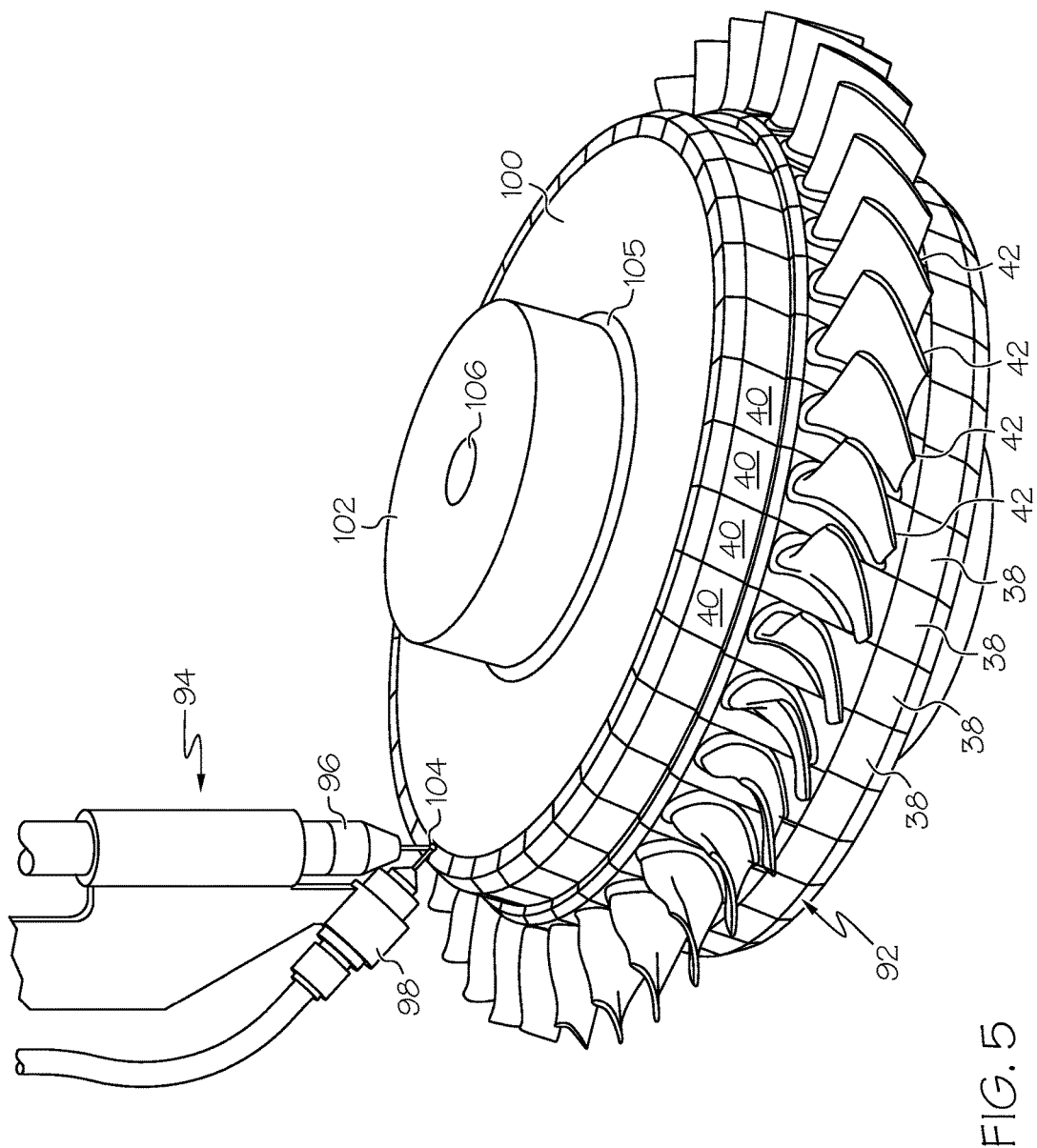
FIG. 5 is an isometric view of the blade ring after insertion of a hub disk and during bonding of metal diaphragms to opposing faces of the blade ring creating a hermetic cavity enclosing the disk-ring interface.

FIG. 4 is a cross-sectional view further illustrating tooling assembly 60 and ring formation 62 during the bonding alloy deposition process. The bonding alloy deposition process is described in more detail below. Referring collectively to FIGS. 3 and 4, tooling part 66 includes an annular body 70 from which a radial flange 72 projects. When assembled, annular body 70 of tooling part 66 and the disc-shaped body of tooling part 68 cooperate to define an annular cavity or annulus 74 (FIG. 4), which accommodates blades 42 of bladed pieces 38 and a portion of their respective shanks 40. Furthermore, as shown most clearly in FIG. 4, tooling parts 66 and 68 includes annular shank contact surfaces 78 and 80, respectively. When bladed pieces 38 are loaded into tooling assembly 62, shank contact surfaces 78 and 80 extend around and contact the tooling contact surfaces 48 and 50 of bladed pieces 38, which collectively form two annular contact rings extending around the ring formation 62. Tooling parts 66 and 68 may thus exert a radially constrictive force on bladed pieces 38 to maintain wedge-shaped shanks 40 in an arch-bound state. Bladed pieces 38 are thus captured or retained in their desired positions within ring formation 62 in a secure manner to facilitate the below-described alloy deposition process.

In the illustrated exemplary embodiment, method 20 (FIG. 1) is utilized to produce an axial turbine rotor. As is typical of many axial turbine rotors, the blade-to-blade spacing between the rotor blades 42 is relatively tight or restrictive. It may consequently be difficult or impractical to access to the shank-to-shank junctions along the outer circumference of ring formation 62 utilizing a deposition tool. Therefore, in the present example, the alloy-filled joints are formed along the inner circumference of ring formation 62, and tooling assembly 60 is designed to provide physical access to the interior or inner perimeter of formation 62. The alloy-filled joints can be formed along the outer circumference of the blade ring 62, however, in further embodiments wherein the shank-to-shank junctions along the outer circumference of the blade ring can be readily accessed with deposition tool. This approach is usefully employed when producing dual alloy GTE rotors, such as radial turbine rotors, characterized by a less restrictive blade-to-blade spacing. In such embodiments, corresponding modifications will be made to the tooling assembly to provide physical and visual access to the outer circumference of the ring formation. Although unlikely, the possibility that alloy-filled joints can be produced along both inner circumference and the outer circumference of the ring formation in further implementations of method 20 (FIG. 1) is not precluded.

After bladed pieces 38 have been arranged in ring formation 62 and installed within tooling assembly 60, a bonding alloy is deposited along the shank-to-shank junctions to produce a plurality of alloy-filled joints to inter-bond the bladed pieces 38 in a solid or coherent blade ring. Deposition of the bonding alloy is advantageously carried-out utilizing a localized fusion deposition process, preferably of the type that enables precise computer control of power input to carefully control heating of the bladed pieces. Suitable localized fusion deposition processes include, but are not limited to, IFF, pulsed-arc MIG welding, and laser cladding deposition processes, as well as other metal additive manufacturing processes. Relative to other processes, IFF and pulsed-arc MIG welding can deposit a relatively large volume of alloy in a relatively short time period. Such processes can thus reduce the duration of manufacture and may permit each alloy-filled joints to be deposited in a single pass of the tooling deposition head. By comparison, laser cladding deposition processes are typically more limited in weld beam size and deposition volumes, but may offer more precise control of heat input. Fully automated additive manufacturing processes, such as three dimensional (3D) metal printing deposition processes can also be utilized to produce the alloy-filled joints in accordance with a pre-established Computer-Aided Design (CAD) model or other 3D object data. In other embodiments, the alloy-filled joints can be produced utilizing a semi-automated deposition process, which does not rely upon a pre-existing digital file in producing the alloy-filled joint. For example, when a semi-automated deposition process is utilized, a computer can be programmed to move the deposition tool (e.g., IFF tool 94) and/or ring formation 62 in a particular manner to deposit the bonding alloy in a desired location and to desired dimensions.

During the deposition process, the bonding alloy can be actively fed or supplied to the site-of-deposition as a metallic powder or wire. In this case, the bonding alloy feed may be continually heated to a temperature exceeding the bonding alloy's melting or softening point utilizing a computer-controlled heat source, such as a laser or electrical arc. For example, when an IFF deposition technique is employed to deposit the bonding alloy, the heat source can be an electrical arc provided via a tungsten electrode and utilized to ionize a stream of gas. In alternative approach, the bonding alloy can initially be prepositioned along or packed into the shank-to-shank junctions. For example, in one embodiment, wire pieces or segments can be positioned within trenches 64 (FIG. 3) and secured in place by, for example, tack welding or adhesive bonding. The wire segments can then be scanned with a laser or other targeted heat source to heat the wire segments to a temperature sufficient to fuse the bonding alloy to bladed pieces 38.

With continued reference to FIG. 4, there is shown an exemplary fusion deposition tool and, specifically, an IFF tool 94 having a plasma arc head 96 and a wire feed head 98. IFF tool 94 is computer controlled to precisely regulate the temperature to which the tip of wire emerging from head 98 is heated and thereby minimize the thermal input applied to bladed pieces 38. In this manner, the melting and resolidification of the blade material, which can otherwise detract from the mechanical properties of the material, can be minimized or entirely avoided. If desired, blade ring 92 can be rotated about its longitudinal or rotational axis (represented in FIG. 4 by double-headed arrow 91) between discrete rotational positions to assist in the alloy deposition process. In particular, IFF tool 94 can be controlled to produce a first alloy-filled joint 90, blade ring 90 can then be rotated or "clocked" by a predetermined amount to bring a second shank-to-shank juncture adjacent (e.g., underneath) tool 94 along which a second alloy-filled joint 90 is formed, and so on. In one embodiment, alloy-filled joints 90 are each produced to have a width and radial thickness between about 10 and 100 millimeters; and, more preferably, between about 30 and 50 millimeters; although the dimensions of joints 90 will inevitably vary amongst embodiments.

As indicated above, the bonding alloy utilized to form alloy-filled joints 90 is preferably selected to have a melt point less than the melt point of the alloy from which bladed pieces 38 are produced (referred to herein as the "blade alloy"). By selecting the bonding alloy to have a lower melt point than does the blade alloy material, undesired melting and resolidification of the blade material can be avoided or minimized during the fusion deposition process. It is also desirable for the bonding alloy to have a relatively high ductility to minimize the formation of cracks and other defects within alloy-filled joints 90 as the bonding alloy cools, solidifies, and shrinks. The particular alloy selected for usage as the bonding alloy will vary amongst embodiments and in relation to the blade alloy. In certain embodiments, the bonding alloy may be composed of the blade alloy material admixed with one or more melt point suppressants. In further embodiments, a commercially-available superalloy, such as 600 series INCONEL®, can be utilize as the bonding alloy.

At the stage of manufacture shown in FIG. 4, bladed pieces 38 are illustrated near the conclusion of the localized fusion-based deposition. Accordingly, alloy-filled joints 90 have been produced along the shank-to-shank junctions with the deposited bonding alloy substantially or entirely filling the wedge-shaped trenches 64 (FIG. 3). As bladed pieces 38 are now joined or bonded by alloy-filled joints 90, the resulting annular structure is identified in FIG. 4 by reference numeral "92" and referred to hereafter as a "bonded blade ring." After deposition of the bonding alloy, blade ring 92 is next bonded to a hub disk (PROCESS BLOCK 28). Blade ring 92 is preferably bonded to the hub disk utilizing a HIP process. Prior to performance of the HIP process, blade ring 92 can be positioned around a hub disk, such hub disk 102 identified in FIGS. 6 and 7 (STEP 28, FIG. 1). If needed, prior to position blade ring 92 about the hub disk, the inner circumferential surface of blade ring 92 can be machined by, for example, turning to impart blade ring 92 with a desired inner diameter and surface finish. The hub disk can be produced separately by, for example, forging and subsequent machining. The hub disk is ideally fabricated from a superalloy tailored to the unique operational environment of the disk; e.g., an alloy having relatively high strength and good low cycle fatigue properties, such as an oxidation-resistant, nickel-based superalloy.

In preparation for the HIP process, a hermetic chamber or cavity can be formed enclosing the hub disk and the inner annular portion of blade ring 92 along which the ring-hub interface is formed. As indicated in FIG. 1 at STEP 30, this can be accomplished by positioning first and second metal diaphragms over opposing faces of the hub disk after inserting the hub disk into the central opening of bonded blade ring 92. The metal diaphragms are then bonded to the hub disk and blade ring 92 to create a hermetically sealed environment along an annular interface between the hub disk and blade ring. Once again, a localized fusion deposition process can be utilized to create circumferential joints bonding the first and second metal diaphragms to the hub disk and blade ring 92. The same or a different localized fusion deposition process can be utilized. This may be appreciated more fully by referring to FIG. 5, which metal diaphragms 100 (only one of which can be seen) are positioned against the axially-opposing faces of bonded blade ring 92 and the concentric hub disk 102. IFF tool 94 is utilized to create inner and outer circumferential joints 104 and 105, respectively, bonding the outer and inner perimeters of illustrated metal diaphragm 100 to blade ring 92. Similar circumferential joints are likewise formed about the outer and inner perimeters of the non-illustrated metal diaphragm. In a preferred embodiment, the circumferential joints overlapping with ends of alloy-filled joints 90 (identified in FIG. 4).

After bonding metal diaphragms 100 to blade ring 92, the resulting hermetic enclosure containing hub disk 102 is evacuated to help create a pressure differential across the disk-ring interface needed HIP bonding. The hermetic enclosure can be evacuated through a channel 106 provided in disk 102 and then sealed utilizing, for example, a pinch tube. Afterwards, the HIP bonding process can be carried-out to bonded blade ring 92 to hub disk 102 (STEP 32, FIG. 1). HIP bonding can be performed by placing blade ring 92, hub disk 102, and metal diaphragm 100 within a furnace and subjecting the structure to elevated temperatures and pressures sufficient to create the desired diffusion bond between blade ring 92 and hub disk 102. Afterwards, the structure can be withdrawn from the HIP furnace and metal diaphragms 100 removed, for example, by machining. After bonding blade ring 92 to hub disk 102, additional processing steps may be performed to complete fabrication of the dual alloy GTE rotor (STEP 34, FIG. 1). Such steps may include additional machining to create the more detailed or refined features of the rotor, as described below.

Figure 6:
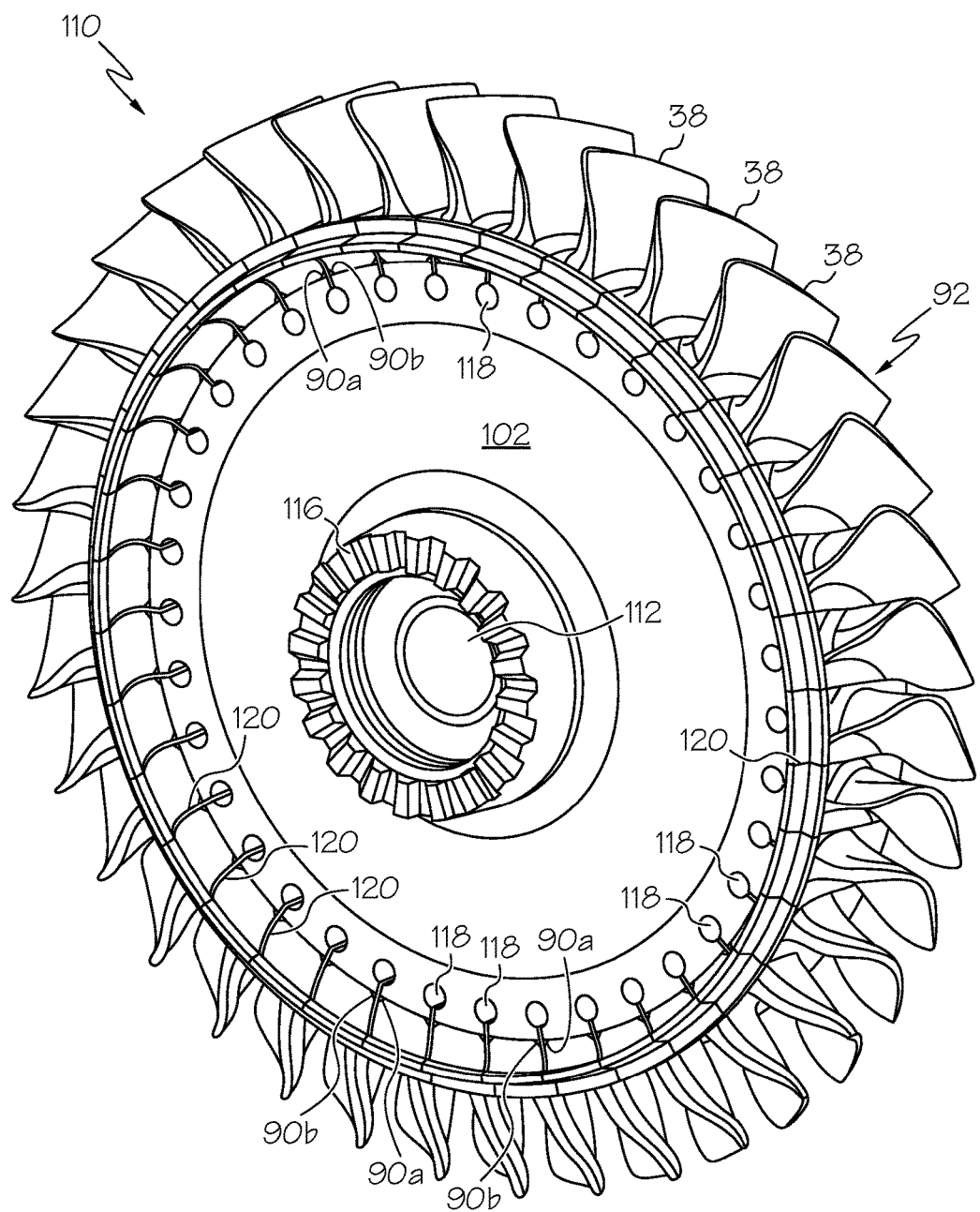
FIG. 6 is an isometric view of a dual alloy GTE rotor produced after diffusion bonding the hub disk shown in FIG. 5 to the blade ring and machining to produce strain relief features within the rotor.

FIG. 6 illustrating a dual alloy GTE rotor 110 in a completed state. Additional machining has been performed to impart dual alloy GTE rotor 110 with an axial bore or central channel 112 extending through hub disk 102. Additionally, a castellated or toothed tubular protrusion 116 has been formed on hub disk 102 for the purpose of mating with a corresponding castellated or toothed member when dual alloy GTE rotor 110 is installed within a gas turbine engine. Finally, stress relief features have further been machined into dual alloy GTE rotor 110. As indicated in FIG. 8, such stress relief features can include enlarged stress relief openings 118 and radial slots 120, which extend into an outer radial portion of hub disk 102 to openings 118. Radial slots 120 may be cut into blade ring 92 after the above-described HIP bonding process utilizing, for example, a wire electrical discharge machining (EDM) process. Radial slots 120 thus help to reduce stresses within GTE rotor 110 during typical gas turbine engine operation resulting from thermal gradients and high speed rotation, while stress relief openings 118 distribute mechanical and thermal stress more uniformly to reduce stress risers within rotor 110.

When formed in the completed GTE rotor 110, radial slots 120 may extend through alloy-filled joints 90 (FIG. 4), but will typically have a width less than that of joints 90; e.g., radial slots 120 may have a width of about 0.3 millimeters. This may be more fully appreciated by referring to FIG. 7, which is a more detailed view of a portion of dual alloy GTE rotor 110 including a limited number of alloy-filled joints 90 and radial split lines 120. As can be seen in FIG. 7, radial slots 120 extend through and bisect joints 90, with each joint 90 being split into two halves 90(*a*) and 90(*b*). Despite being severed in this manner, alloy-filled joints 90 are still considered "joints" in the context of this document in that joints 90 previously joined circumferentially-adjacent bladed pieces 38 included in blade ring 92. Stress relief openings 118 are formed radially inboard of alloyed-filled joints 90. In further embodiments, GTE rotor 110 may lack radial slots 120 such that joints 90 remain intact in the completed rotor.

There has thus been provided embodiments of a manufacturing process for producing a dual alloy GTE rotor including a hub disk and rotor blades fabricated from different alloys tailored to their unique operating environments. During the course of the manufacturing process, a blade ring is produced from a number of bladed pieces, which are joined together by depositing a bonding alloy utilizing a localized fusion deposition process of the type that enables precise computer control of power input to carefully control heating of the bladed pieces. In this manner, the temperatures at which the fusion deposition process is carried-out can be minimized, and the formation of cracks or other deflects within the alloy-filled joints can be reduced or eliminated. Additionally, the bladed pieces to be individually cast or otherwise produced from a wide range of alloys including, but not limited to, equiax, single crystal, and directionally-solidified alloys. Finally, as compared to other manufacturing processes enabling an outer blade ring to be joined to a hub disk, the above-described manufacturing process can reduce the cost and complexity of rotor manufacture, minimizes leakage across the turbine rotor, and allows a decrease in the overall size and weight of the turbine rotor.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method for manufacturing a bladed Gas Turbine Engine (GTE) rotor, the method comprising:
    arranging bladed pieces in a ring formation such that shank-to-shank junctions are formed between circumferentially-adjacent bladed pieces;
    depositing a first alloy along the shank-to-shank junctions utilizing a localized fusion deposition process to produce a plurality of alloy-filled joints bonding the bladed pieces in a bonded blade ring having a central opening;
    inserting a hub disk into the central opening of the bonded blade ring;
    positioning metal diaphragms over opposing faces of the hub disk after inserting the hub disk into the central opening of the bonded blade ring:
    forming circumferential joints around outer peripheries of the metal diaphragms. the circumferential joints bonding the metal diaphragms to the bonded blade ring and overlapping with the alloy-filled joints; and
    bonding the bonded blade ring to the hub disk;
    wherein, during the step of depositing, a localized heat input is applied to the first alloy utilizing a computer-controlled deposition tool to form each of the plurality of alloy-filled joints in a single pass or to gradually build-up each of the plurality of alloy-filled joints along the shank-to-shank junctions in accordance with pre-established three dimensional object data; and
    wherein the same localized fusion deposition process is utilized to deposit first alloy and to form the circumferential joints around the outer peripheries of the metal diaphragms.

2. The method of claim 1 wherein the plurality of alloy-filled joints are spaced around a circumference of the bonded blade ring.

3. The method of claim 2 wherein the alloy-filled joints are spaced around an inner circumference of the bonded blade ring.

4. The method of claim 3 further comprising maintaining the bladed pieces in the ring formation utilizing tooling while depositing the first alloy along the shank-to-shank junctions, the tooling having a central opening through which the inner circumferential surface is exposed.

5. The method of claim 1 wherein the bladed pieces are produced from a second alloy, and wherein the method further comprises selecting the first alloy to have a ductility higher than the second alloy.

6. The method of claim 5 wherein the second alloy comprises a single crystal alloy.

7. The method of claim 1 wherein, during deposition of the first alloy along the shank-to-shank junctions, local heat input is controlled to heat the first alloy at a site-of-deposition to a predetermined temperature greater than a melt point of the first alloy.

8. The method of claim 7 wherein the heat source is selected from the group consisting of a laser and an arc.

9. The method of claim 8 wherein the first alloy is actively supplied to the site-of-deposition as a powder alloy feed during deposition of the first alloy along the shank-to-shank junctions.

10. The method of claim 8 wherein the first alloy is actively supplied to the site-of-deposition as a wire alloy feed during deposition of the first alloy along the shank-to-shank junctions.

11. The method of claim 7 wherein deposition of the first alloy along the shank-to-shank junctions comprises:
    positioning discrete pieces of the first alloy adjacent the shank-to-shank junctions; and
    fusing the discrete pieces of the first alloy to the bladed pieces along the shank-to- shank junctions.

12. A bladed Gas Turbine Engine (GTE) rotor, comprising:
    a blade ring comprised of a plurality of bladed pieces fabricated from a blade alloy;
    a hub disk to which the plurality of bladed pieces are bonded;
    alloy-filled joints spaced about an inner circumference of the blade ring and composed of a bonding alloy having a ductility greater and a melt point less than the blade alloy; and
    radial slots formed in the blade ring, the radial slots extending through and bisecting the alloyed-filled joints.

13. The dual alloy GTE rotor of claim 12 wherein the plurality of bladed pieces are cast from one of the group consisting of a single crystal and a directionally-solidified superalloy.

14. The method of claim 1 depositing comprises:
    rotating the ring formation by a predetermined amount to position one of the shank-to-shank junctions adjacent the computer-controlled deposition tool;

after rotating the ring formation, depositing an alloy-filled joint along the shank-to-shank junction positioned adjacent the computer-controlled deposition tool; and repeating the steps of rotating and depositing, as needed, to form the alloy-filled joints along all of the shank-to-shank junctions and yield the bonded blade ring.

15. A method for manufacturing a bladed Gas Turbine Engine (GTE) rotor, the method comprising:

arranging bladed pieces in a ring formation such that shank-to-shank junctions are formed between circumferentially-adjacent bladed pieces;

depositing a first alloy along the shank-to-shank junctions utilizing a localized fusion deposition process to produce a plurality of alloy-filled joints bonding the bladed pieces in a bonded blade ring having a central opening;

inserting a hub disk into the central opening of the bonded blade ring;

bonding the bonded blade ring to the hub disk; and after bonding the bonded blade ring to the hub disk, forming at least one radial slot in the blade ring extending through at least one of the alloyed-filled joints.

\* \* \* \* \*